April 8, 1958  L. WOLFE  2,830,183
QUANTITY GAUGE
Filed Sept. 9, 1944
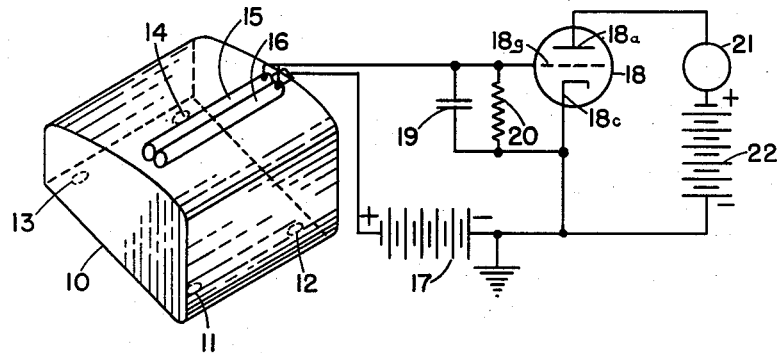
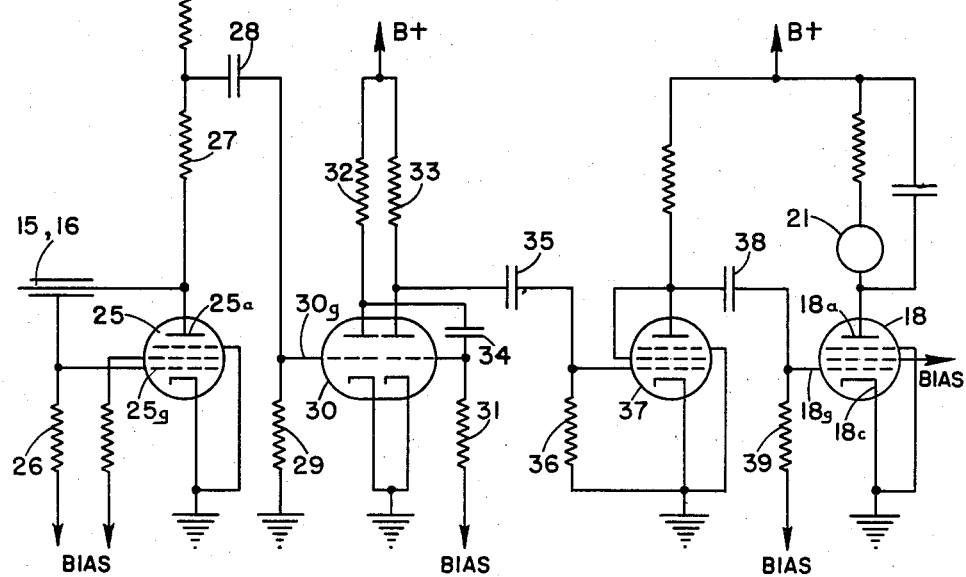
Inventor
LESTER WOLFE
By W. Glenn Jones
Attorney

United States Patent Office 2,830,183
Patented Apr. 8, 1958

2,830,183

QUANTITY GAUGE

Lester Wolfe, United States Navy

Application September 9, 1944, Serial No. 553,407

9 Claims. (Cl. 250—43.5)

(Granted under Title 35, U. S. Code (1952), sec. 266)

This application is a continuation in part of my application Ser. No. 531,252, filed April 15, 1944, now abandoned.

This invention relates to a method of measuring mass, and it is particularly concerned with a new method and apparatus for continuously measuring the quantity of a material in a container, such as the amount of fuel in the tanks of a ship or an aircraft, or the amount of material in a bin.

The primary object of this invention is to provide a method of measuring the mass of a substance within a given space independently of shape, position or motion of the mass being measured. The method is particularly applicable to the determination of the quantity of liquid in a tank or container subject to agitation or other motion. In a preferred form the method of this invention is applied to the measurement of fuel in aircraft tanks.

Another object of the invention is to provide certain apparatus especially designed for use in quantity measurements in accordance with this invention.

In particular the invention includes a new method of mass measurement utilizing the principle of detection of penetrating radiation by means of Geiger-Müller tubes in conjunction with certain novel apparatus designed for this purpose.

There are many situations in which it is highly desirable to measure the quantity of a substance present within a confined space, and to measure it continuously, accurately and independently of the motion, shape or physical state of the substance or container. Two common examples are the measurement of the amount of fuel contained in a tank of a ship or an aircraft. Both aircraft and ships carry liquid fuel in odd-shaped tanks built into various parts of the vessel and the difficulties involved in measuring the amount of fuel in such tanks by mechanical or hydrostatic means are evident. The acceleration, deceleration and general variable attitude of the aircraft present unique and almost insuperable problems. The pitching and rolling of even large ships offer difficulties but much less formidable than those of the aircraft.

There are many disadvantages to the present day methods of fuel measurement in aircraft all of which depend on the use of a float in the fuel itself, or some form of capacitance bridge circuit. The measurement is affected by the acceleration, deceleration and general irregular movement of the aircraft and turbulence of the fuel in the tank. Mechanical devices measure volume, not mass or quantity, and readings require temperature corrections for good estimates of range. Float operated devices are least precise when precision is most needed, namely when fuel is low. For example, it was found that a standard float-operated gauge in use in a great many airplanes today read "empty" when a fifty gallon wing tank still contained twenty-two gallons of gasoline. Furthermore, mechanical devices are exceedingly awkward in geometrically unsymmetrical tanks, and their installation in leak proof gasoline tanks is undesirable in that it necessitates entering the tank.

The method of this invention comprises, briefly, projecting a beam of penetrating radiation, such as X-rays or other active emanations such as the gamma radiation of radioactive materials through the given space, for example, a tank, bin or pipe, and measuring the intensity of the radiation either in said space or emergent therefrom. This intensity for a known quantity and source of radiation is a function of the absorption of the radiation by the material in the space, or, in other words, it is a function of the mass or quantity of the material through which the radiation passes. Therefore, by means of a properly designed and calibrated radiation detector a continuous estimate of the quantity of material in the space is at all times available. For compactness and constancy of radiation and particularly for use in conjunction with a space which is subject to motion, such as an aircraft or ship tank, a very convenient source of radiation is a radioactive material which can be distributed around the tank in relation to the detector so as to render the measurement substantially independent of the tilt of the tank within fairly wide limits.

A practicable kind of detector for use with such extremely penetrating radiations as X-rays and radium emanations is a combination of one or more Geiger-Müller tubes and a source of fairly high potential (e. g., 500 to 1000 volts) applied to the electrodes of the tubes. These tubes are connected in conventional manner to an electronic circuit, which is designed to pass an amount of current proportional to the number of discharges of the tubes per unit time. This indication in turn is made a measure of the mass or quantity of material in the tank, bin, or given space, when used as indicated above.

The construction of Geiger-Müller tubes and their use with electronic circuits is well known. Briefly, the Geiger-Müller tubes comprise one or more pairs of electrodes surrounded by a mixture of gas and by vapor under a pressure between about 10 and 200 mm. of mercury at ordinary temperatures, the electrodes generally being about a half-centimeter or more apart. A potential is applied across the electrodes which is just insufficient to cause a discharge. With the tube in this condition the ionization of one or more gas molecules caused by impact with a photon, electron, proton or other high velocity particle or packet of radiant energy, results in a discharge between the electrodes which is almost immediately quenched. In this way the tube discharges or pulses at a rate which is proportional to the amount of incident radiant energy, and a determination of the number of discharges per unit time is a measure of the intensity of the incident radiant energy.

In order that the invention may be clearly understood typical embodiments thereof are described in detail with reference to the accompanying drawings in which:

Figure 1 is a schematic diagram of the method and apparatus of the invention as applied to the measurement of the quantity of liquid in a tank;

Figure 2 is a schematic diagram of a more elaborate apparatus embodying the invention.

Referring to Figure 1, tank 10, for example, an airplane wing tank or ship's fuel tank, is shown equipped with several small pellets or "buttons" 11, 12, 13, and 14 containing a radioactive compound placed on the bottom and near its corners. Adjacent to the top of the tank 10 are placed one or more Geiger-Müller tubes 15 and 16, which are made about a foot long in order to receive radiation over a large angle from each of the buttons. Geiger-Müller tubes 15 and 16 are not critical and conventional tubes are perfectly satisfactory except possibly where extreme changes in ambient temperature or pressure are encountered.

The electrodes from the tubes 15 and 16 are connected in parallel, one electrode of each being connected to a positive potential of about 1000 volts from a source shown as a battery 17. Any conventional power supply may be used for this purpose provided the high voltage is regulated well enough to keep the tube within its operating range. The other electrodes of the tubes 15 and 16 are connected to the grid 18g of a tube 18. A circuit comprising a capacitor 19 and resistor 20 and having a relatively long time constant as compared with the time of a single discharge of the Geiger-Müller tubes is connected between the grid 18g and the cathode 18c, and a current indicating device (e. g., a milliammeter) 21 is connected between the anode 18a and the cathode 18c in series with a source of potential 22. The meter 21 may be calibrated directly in terms of fuel quantity rather than in electrical units. Emanations from the buttons 11, 12, 13, and 14, which are intercepted by the tubes 15 and 16 cause momentary discharges or pulses in the tubes, which pulses charge the capacitor 19 positively causing the grid 18g to assume a corresponding potential. This causes plate current (proportional to the charge on the capacitor 19) to flow (or increase) in tube 18 and be indicated by the meter 21. The charge on the capacitor 19 tends to drain off through the resistor 20 at a rate determined by the sizes of the capacitor 19 and resistor 20. However, the rapidly recurring pulses of the tubes 15 and 16 maintain the charge on the capacitor 19 at a potential which depends on the rate at which the tubes 15 and 16 discharge. Therefore, the current indicated by the meter 21 is a direct indication of the absorption of radiation in the tank 10, or of the amount of fuel present in the tank.

By proper placement of the buttons 11, 12, 13, and 14 and of the tubes 15 and 16 (such as is shown) the reading of the meter 21 may be made almost independent of the position of the tank 10, within fairly wide limits, say 10° or 15° rotation from horizontal in a fore-and-aft direction, an amount of pitch often encountered in aircraft. Thus, the meter 21 gives a true reading regardless of the attitude of the aircraft. The capacitor 19 and resistor 20 are proportioned to have a time constant high enough with respect to the discharge rate of the Geiger-Müller tube to make the reading of meter 21 substantially independent of turbulence of the fuel in the tank.

The single meter with its single scale can be made to serve as the quantity indicator for all the tanks on the vessel. The method or means for switching from one measuring circuit to another is quite conventional and need not be shown. Since it is quite likely that several tanks on a vessel will have different geometric forms, use of the same meter as the indicator for each involves taking into account the geometrical configuration of the tank and so distributing the radiation buttons that the intensity of radiation emergent from all the tanks will be the same at the same relative levels. That is to say, when the amount of fuel in any tank has dropped to 50%, the radiation emergent from that tank should be of an intensity such that it will produce an indication of 50% on the meter scale. In this way, the single meter is made to serve as the indicator for all of the tanks.

As pointed out above, Geiger-Müller tubes are conventionally filled with a gas-alcohol mixture, the alcohol being added to make the tube self-quenching. When a tube is not self-quenching, it is necessary to provide quenching arrangements in the circuit external to the tube. In the use of my invention in aircraft, it is entirely possible that at high altitudes the Geiger-Müller tubes will be exposed to temperatures at which the alcohol vapor will condense. In such an event the tube will not be self-quenching but will give a relatively continuous discharge with a consequent spurious meter indication.

In Figure 2 there is illustrated a more elaborate embodiment of the invention in which component parts in so far as possible have been numbered to correspond to those shown in Figure 1. Referring to Figure 2 the Geiger-Müller tubes 15 and 16 are shown in order to provide a starting point for the circuit. The tank, shown in Figure 1 is omitted. Geiger-Müller tubes 15 and 16 are connected in parallel with quenching tube 25 by connecting the anodes to the plate 25a and the cathode to the control grid 25g, which grid is connected to ground or a source of biasing voltage through resistor 26, which corresponds approximately to resistor 20 of Figure 1. The screen and suppressor grids of tube 25 are biased and connected to ground in conventional manner. The signals taken from plate resistor 27 of tube 25 are coupled through resistance-capacitance network 28, 29 to the two-stage amplifying circuit shown as double triode 30, resistors 31, 32, and 33, and capacitor 34. The amplifying circuit is coupled through capacitor 35 and resistor 36, to inverter tube 37. From this tube the signals are coupled to a pulse frequency measuring or counting circuit through capacitor 38 and resistor 39 in a manner analogous to the direct coupling of the Geiger-Müller tube to the pulse frequency counting circuit explained above in connection with Figure 1. The power supplies, indicated in conventional manner as high voltage, B+ and bias, in Figure 2, can be any reasonably steady direct current supplies. For example, the high voltage for tube 25 and the Geiger-Müller tubes would be about 1000 volts, the B+ for tubes 36 and 18 about 250 volts.

To clarify the operation of the circuit, it is helpful to trace a single pulse through it. Emergent radiation from the tank being metered impinges upon and activates Geiger-Müller tubes 15 and 16 causing them momentarily to conduct and create a positive voltage pulse across resistor 26. This pulse causes tube 25, which is normally biased to cutoff, to conduct strongly thus dropping the plate voltage and quenching the Geiger-Müller tube by reducing its cathode-to-anode voltage to a value below the operating value for the tube. The negative pulse created by the drop in plate voltage is applied to the control grid 30g of tube 30 where it is amplified, inverted, and applied to the second half of tube 30 where a second amplification and inversion takes place. The pulse, again negative, is coupled to inverter tube 37 through capacitor 35 and resistor 36 where it is inverted again to a positive pulse and applied to the grid of tube 18 to affect the flow of current there. It is clear, thus, that the effect on the measuring circuit of the amplified and inverted pulses are essentially the same as that of the directly coupled pulses such as those counted in the arrangement shown in Figure 1.

The advantages of this method of fuel measurement for an aircraft may be summarized as follows:

The reading is relatively independent of acceleration or motion of the fuel in the tank;

The system measures the quantity of fuel by measuring its mass not volume alone;

The instrument may be designed to have maximum sensitivity at any part of its range (by placement of radioactive material and the Geiger-Müller tubes) and ordinarily it is most sensitive at minimum fuel in the tank because under this condition the discharge rate of the tubes 15 and 16 is a maximum;

The system has no mechanically moving parts, it may be completely enclosed, and is not subject to the disorders common to mechanical systems;

All equipment may be placed on the outside of the tank, so that it is admirably suited for use with tanks having leak proof liners.

It is not necessary that the radioactive compound be placed in the form of buttons, but it may be mixed with paint and applied generally over large areas of the tank. However, the use of pellets or buttons of radium compound is generally safer and more economical.

The particular electronic circuit employed may be modified in many ways from that shown in Figure 1 according to the precise operation desired. For instance the values of the capacitor 19 and the resistor 20 may be varied widely, provided the combination gives a sufficiently long discharge time in the circuit employed to average out turbulence of the material being measured or other fluctuations of short duration in the intensity of radiation incident on the Geiger-Müller tubes.

The input to tube 18 and the measuring circuit beyond can be made responsive to positive or negative pulses. That is, by proper connection of electrodes of the detector to the counting and measuring circuit and by properly biasing the tube 18, the current flow through the tube can be made inversely or directly proportional to the amount of material being measured. Generally it is most convenient to permit current flow through the tube to increase with decrease of amount of material being measured, which is the arrangement used in the embodiments illustrated in Figures 1 and 2. This is merely a design consideration, for once the manner of current variation is selected the meter scale is calibrated directly in material quantity units. For example, if it were desired to have current flow in tube 18 to decrease with decrease of quantity of fuel being metered, this could be done by omitting the inverter 37, of the embodiment shown in Figure 2.

Compensation of the apparatus can be accomplished in the electronic circuit external to the tubes. For example a variable thermosensitive current limiting resistor could be placed in the grid or plate circuit of the tube 18 in the embodiment of Figure 1 in a manner familiar to any electronics engineer. Its size and placement, of course, would depend upon the size of the installation and the portion or portions of the entire apparatus exposed to the ambient temperature variation.

Although the specific embodiment of this invention was described as a fuel quality gauge for use in aircraft to demonstrate its utility under the most severe conditions, the general applicability of the invention should be apparent. This same aparatus with no substantial alteration in design could be used on board a ship or could even be installed in an automobile. The measurement need not be restricted to liquid materials for solid, granular or powdered materials could be measured in substantially the same manner as set out above by installing the radioactive buttons on the bottom of the bin containing the material and placing the counters on top. Such installation is an excellent quantity gauge for powdered coal, which at present is pratically impossible to measure. The installation could also be made to measure quantities of materials contained in vessels in a variety of other ways.

In connection with the use of the apparatus as a fuel quantity gauge aboard aircraft it is well to note that although Geiger-Müller tubes when containing only a gas are substantially temperature and pressure insensitive other parts of the apparatus are not. This is especially true of the capacitors. Therefore, in assembling an apparatus for use in aircraft, the circuit or at least its pressure sensitive elements should be sealed into airtight units.

The quantity of radioactive material or other source of penetrating radiation (such as X-rays in a large, stationary installation) must be sufficiently large to provide a discharge, or counting, rate of the Geiger-Müller tubes, which is at all times above the normal background count occurring from extraneous radiation, such as cosmic rays. On a statistical basis, this means that the discharge rate under conditions of maximum absorption should be at least twice the background rate occurring in the absence of the radioactive material.

In the above specification I have described two specific embodiments of the invention, one a relatively simple embodiment employing self-quenching Geiger-Müller tubes, the other a more elaborate embodiment employing non-quenching Geiger-Müller tubes necessitated by the fact that exposure of the alcohol-containing self-quenching tube to extremely low ambient temperatures might condense the alcohol and convert the tube to the non-quenching type. It is apparent that the condensation of the alcohol can be avoided and consequent difficulty avoided by using a thermostatically controlled heating element to maintain the tubes 15 and 16 of Figure 1 at a temperature high enough to prevent such an occurrence.

Since many different embodiments of this invention could be made without departing from the scope of this invention, it is intended that all matter contained in the above description or shown in the accompanying drawings shall be interpreted as illustrative and not in a limiting sense.

The invention described herein may be manufactured and used by or for the Government of the United States of America for governmental purposes without payment of any royalties thereon or therefor.

Having described my invention, what I claim as new and desire to secure by Letters Patent is:

1. Apparatus for measuring the quantity of material in a container subject to movement which comprises a container, penetrating radiation source means positioned relative to said container so that radiation is widely propagated through the material whereby a change in the quantity of material within said container causes a change in the intensity of emergent radiation, radiation detector means positioned to receive a substantial cross-section of said radiation such that the intensity of radiation received by the detector is proportional to the average of the quantity of material intercepting said radiation over a given area, at least one of said means being operative at points having a wide distribution in at least two dimensions adjacent one wall portion of the container, and the other being operative at points having a wide distribution in at least one dimension adjacent an opposite wall portion of the container, and measuring means coupled to the detector to indicate the average intensity of emergent radiation per unit of time.

2. Apparatus for measuring the quantity of material in a container subject to movement which comprises, a container, a plurality of widely distributed sources of penetrating radiation positioned relative to said container so that radiation is propagated through the material in a direction extending between top and bottom of the container whereby a change in the total quantity of material within said container causes a change in the intensity of emergent radiation, a radiation detector positioned to receive a substantial cross-section of the radiation such that the intensity of radiation received by the detector is proportional to the average total of the quantity of material intercepting said radiation over a given area, and measuring means coupled to the detector to indicate the average total intensity of emergent radiation per unit of time.

3. Apparatus for measuring the quantity of fuel in an aircraft tank subject to movement which comprises a tank, penetrating radiation source means positioned relative to said tank so that radiation is widely propagated through the fuel in said tank, radiation detector means comprising at least one Geiger-Müller tube positioned to receive a substantial cross-section of said radiation emerging from said fuel such that the intensity of said radiation received by the detector is proportional to the average of the quantity of fuel intercepting said radiation over a given area, at least one of said means being operative at points having a wide distribution in at least two dimensions adjacent one wall portion of the tank, and the other being operative at points having a wide distribution in at least one dimension adjacent an opposite wall portion of the tank, and an electronic circuit connected to said detector which indicates the average number of discharges of the detector per unit of time.

4. A gauge for measuring the quantity of fluid within a tank subject to movement which comprises, a tank, a plurality of spaced sources of penetrating radiation positioned relative to said tank so that radiation is propagated through the fluid in said tank in paths extending between top and bottom of the tank, a radiation detector comprising at least one Geiger-Müller tube positioned to receive a substantial cross-section of said radiation such that the intensity of radiation received by the detector is proportional to the average of the quantity of material inercepting said radiation over a given area, and an electronic circuit connected to said detector which indicates the average number of discharges of said detector per unit of time, said electronic circuit being designed so that said unit time is sufficiently long to minimize the effect of turbulence of said fluid on the indication of said average number of discharges.

5. A gauge for measuring the quantity of fluid within a tank subject to movement which comprises a plurality of spaced sources of penetrating radiation positioned relative to said tank adjacent the surface of the tank diametrically opposite the side of the tank adjacent the free surface of the fluid so that radiation is propagated through the fluid in said tank in paths extending between top and bottom of the tank, a radiation detector comprising at least one Geiger-Müller tube positioned to receive a substantial cross-section of said radiation such that the intensity of radiation received by the detector is proportional to the average of the quantity of fluid intercepting said radiation over a given area to minimize the effect of variations in distribution of fluid throughout the tank, and an electronic circuit connected to said detector which indicates the average number of discharges of said detector per unit time, said electronic circuit being designed so that said unit time is sufficiently long to minimize the effect of turbulence of said fluid on the indication of said average number of discharges.

6. A gauge for measuring the quantity of fluid within a tank subject to movement which comprises a radioactive-material impregnated paint covering the side of the tank diametrically opposite the side adjacent the free surface of the fluid and serving as a source of penetrating radiation propagated through the fluid in said tank, a radiation detector comprising at least one Geiger-Müller tube positioned at the top side of the tank adjacent the free surface of the fluid to receive a substantial cross-section of said radiation such that the intensity of radiation received by the detector is proportional to the average of the quantity of material intercepting said radiation over a given area, and an electronic circuit connected to said detector which indicates the average number of discharges of said detector per unit time, said electronic circuit being designed so that said unit time is sufficiently long to minimize the effect of turbulence of said fluid on the indication of said average number of discharges.

7. Apparatus for determining the quantity of material in a container comprising distributed penetrative radiation source means disposed relative to said container so as to cause radiation therefrom to permeate the space enclosed by said container and to be subject to absorption by the material therein, independently of motion, shape or physical state of said material, whereby a change in the quantity of the material in the container causes the resultant change in the radiation emergent therefrom to bear a definite relation to said quantity, radiation responsive means disposed relative to said container so as to collect a substantial cross-section of the emergent radiation such that the intensity of the collected radiation is a function of the material in the container, and means to translate the intensity of the collected radiation into proportionate electric energy changes.

8. Apparatus for determinging the quantity of material in a container comprising a plurality of penetrative radiation sources positioned adjacent to and distributed over the surface of said container so as to cause radiation emanating from said sources to permeate the space enclosed by said container and to be subject to absorption by the material therein, independently of motion, shape or physical state of said material, whereby a change in the quantity of the material in said container causes the resultant change in the radiation emergent therefrom to bear a definite relation to said quantity, radiation responsive means disposed relative to said container so as to collect a substantial cross-section of the emergent radiation such that the intensity of the collected radiation is a function of the quantity of the material in the container, and electrical means to produce an output current proportional to the intensity of said emergent radiation.

9. Apparatus for determining the quantity of material in a container comprising distributed radioactive source means disposed relative to said container so as to cause radiation therefrom to permeate the space enclosed by said container and to be subject to absorption by the material therein, independently of motion, shape or physical state of said material, whereby a change in the quantity in the material in said container causes the resultant change in the intensity of the radiation emergent therefrom to bear a definite relation to said quantity, radiation responsive means disposed relative to said container so as to collect a substantial cross-section of the emergent radiation such that the intensity of the collected radiation is a function of the quantity of the material in said container, and means to translate the intensity of the collected radiation into proportionate electric energy changes.

References Cited in the file of this patent
UNITED STATES PATENTS

| Number | Name | Date |
| --- | --- | --- |
| 1,610,747 | Colton | Dec. 14, 1926 |
| 1,851,215 | Schunemann | Mar. 29, 1932 |
| 2,315,819 | Schlesman | Apr. 6, 1943 |
| 2,316,239 | Hare | Apr. 13, 1943 |
| 2,323,128 | Hare | June 29, 1943 |
| 2,348,810 | Hare | May 16, 1944 |

OTHER REFERENCES

Journal of Research of the National Bureau of Standards, vol. 23; June 1939. Research paper RP1223, pages 137 to 143.